No. 764,497. PATENTED JULY 5, 1904.
J. F. PEASE & E. SCHUMACHER.
TIRE AND RIM FOR VEHICLE WHEELS.
APPLICATION FILED DEC. 21, 1903.
NO MODEL. 2 SHEETS—SHEET 1.

No. 764,497. PATENTED JULY 5, 1904.
J. F. PEASE & E. SCHUMACHER.
TIRE AND RIM FOR VEHICLE WHEELS.
APPLICATION FILED DEC. 21, 1903.
NO MODEL. 2 SHEETS—SHEET 2.
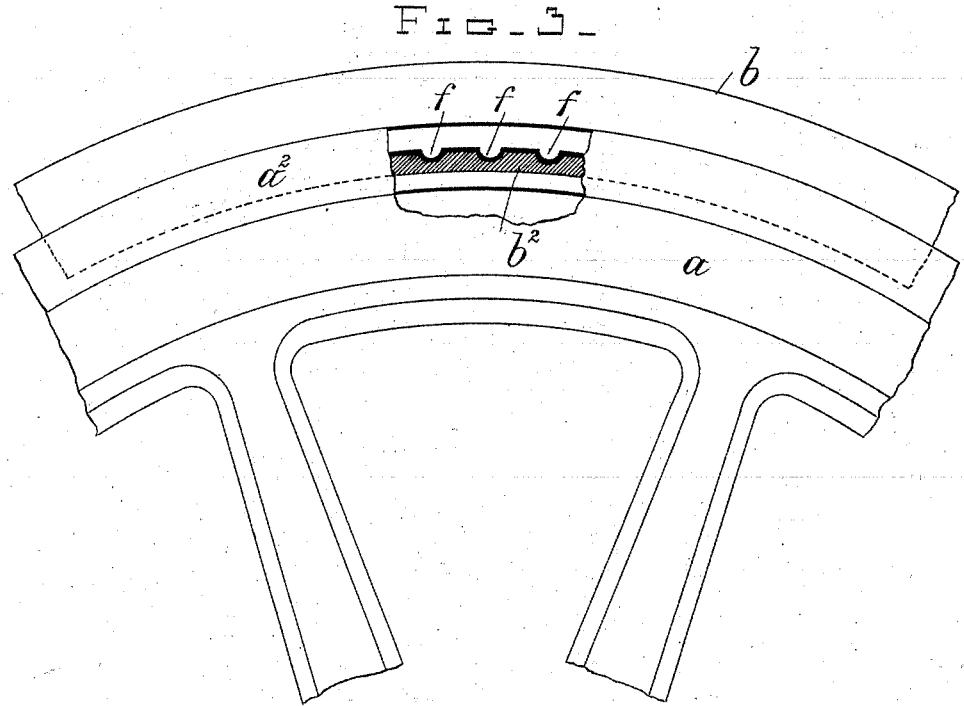

No. 764,497.

Patented July 5, 1904.

UNITED STATES PATENT OFFICE.

JOHN FRANCIS PEASE AND EBERHARD SCHUMACHER, OF DARLINGTON, ENGLAND.

TIRE AND RIM FOR VEHICLE-WHEELS.

SPECIFICATION forming part of Letters Patent No. 764,497, dated July 5, 1904.

Application filed December 21, 1903. Serial No. 186,119. (No model.)

*To all whom it may concern:*

Be it known that we, JOHN FRANCIS PEASE and EBERHARD SCHUMACHER, subjects of the King of Great Britain and Ireland, residing at Darlington, in the county of Durham, England, have invented certain new and useful Improvements in Tires and Rims of Wheels for Motor-Cars, Velocipedes, and other Vehicles; and we do hereby declare the following to be a full, clear, and exact description of the invention, such as will enable others skilled in the art to which it appertains to make and use the same.

The object of this invention is to provide a rubber tire in conjunction with a suitably-shaped rim which can be used as a pneumatic tire or otherwise and to further provide in connection with such tires and rims tooth-shaped indentations, such as notches or corrugations, adapted to prevent circumferential displacement of the tire within the rim.

In order to clearly indicate in what manner our said invention can be carried into effect, we will now proceed to describe the same with reference to the annexed sheet of drawings, in which—

Figure 1:
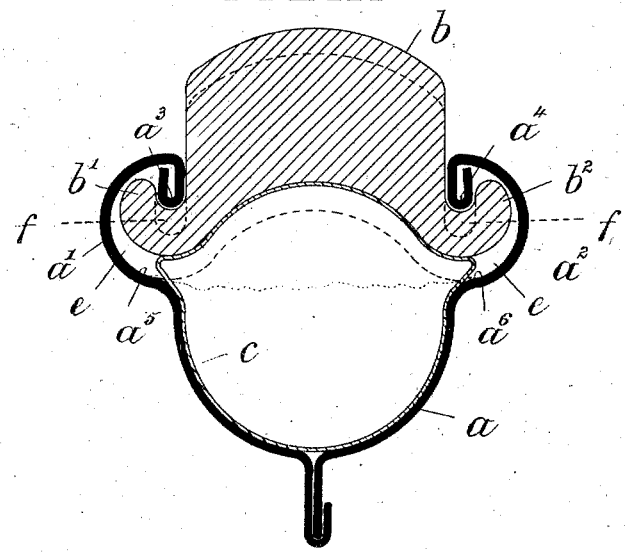
Figure 2:
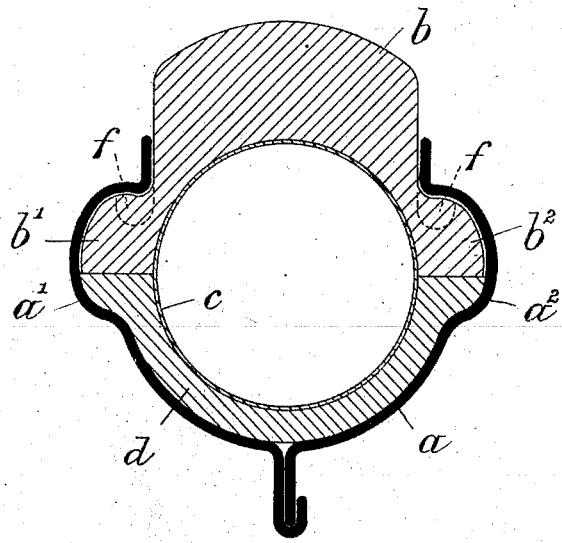

Figures 1 and 2 are transverse sectional views of two modifications of rubber tires and rims as designed and fitted together in accordance with our invention, Fig. 3 being a front elevation of part of the rim, showing a series of indentations for the prevention of circumferential tire-slipping.

In the figures, $a$ is the metal rim of the wheel, $b$ the rubber tire, and $c$ the pneumatic tube. What we have termed the two "inner" ends of the rubber tire are the parts $b'$ $b^2$, which are in the form of circumferential beads or shoulders of irregular or any suitable shape, such as that shown in Fig. 1 or as modified in Fig. 2, the rim $a$ being correspondingly furnished with circumferential extensions or recesses $a'$ $a^2$ to accommodate the beads or shoulders $b'$ $b^2$. By a proper adjustment of these parts we attain the result that when the pneumatic tube $c$ is inflated and the rubber tire sprung out the beads or shoulders $b'$ $b^2$ thereof are pressed against the inset parts $a^3$ $a^4$ of the rim extension and the tire supported in tensile contact with the pneumatic tube.

In Fig. 1 when the pneumatic tube is deflated the tire $b$ slips back into the rim $a$ to the position shown in dotted lines in Fig. 1, the tire being supported on the outset parts $a^5$ $a^6$ of the rim extensions $a'$ $a^2$.

In Fig. 2 the tire $b$ is seated upon an inner rubber lining $d$ and simply retains the same position with or without the support of the pneumatic tube.

In the modification as shown in Fig. 1 it is essential that the space at $e$ shall be as restricted as possible, for these reasons: that when inflated the pneumatic tube will extend into each space $e$ and when deflated it is desirable to afford as little distance as possible for the tire to slip back to reach the support of rim at $a^5$ $a^6$.

In the modification shown in Fig. 2 it is essential to obtain between the tire $b$ and inner lining $d$ as near an approximation to actual contact at all times as possible. It is therefore preferable to restrict the size of the recesses $a'$ $a^2$ of the rim to whatever is sufficient for the insertion of the tire, which will be effected by first threading the bead or shoulder into position on one side of the rim and then by sufficiently compressing the width of the tire to thread in the opposite bead or shoulder into the other side of the rim $a$.

In the case of motor-cars it is found that the tangential strain on the tire is sufficient to give trouble by producing circumferential displacement thereof in the rim. To overcome this objection, we provide the rim with projections $f$, as shown in Fig. 3 and in dotted lines in Figs. 1 and 2. The tire is provided with indentations, notches, or corrugations corresponding in shape to the projections $f$, which fit therein, thereby preventing the circumferential displacement of the tire.

Having thus described our invention, what we claim, and desire to secure by Letters Patent, is—

1. The combination of a tire provided with grooves or indentations and with projecting ears, of a rim provided with projections adapted to engage said indentations and bent over to engage said ears, and an inflatable tube located between said tire and said rim, substantially as described.

2. The combination of a tire provided with indentations and with projecting edges, a rim made of two pieces of material, one bent over the other and provided with projections adapted to engage said indentations and having its ends bent over to engage said ears, and an inflatable tube located between said tire and said rim, substantially as described.

In testimony whereof we affix our signatures in presence of two witnesses.

JOHN FRANCIS PEASE.
EBERHARD SCHUMACHER.

Witnesses:
FREDERICK W. LANDALE,
JENS E. D. PETERSEN.